United States Patent
Peisa et al.

(10) Patent No.: US 8,441,973 B2
(45) Date of Patent: May 14, 2013

(54) FAST DORMANCY REQUESTS IN COMMUNICATION SYSTEMS

(75) Inventors: Janne Peisa, Espoo (FI); Béla Rathonyi, Lomma (SE); Martin van der Zee, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 274 days.

(21) Appl. No.: 13/029,395

(22) Filed: Feb. 17, 2011

(65) Prior Publication Data

US 2011/0222451 A1 Sep. 15, 2011

Related U.S. Application Data

(60) Provisional application No. 61/305,313, filed on Feb. 17, 2010.

(51) Int. Cl.
*G08C 17/00* (2006.01)
(52) U.S. Cl.
USPC .............................. 370/311; 370/331; 370/496

(58) Field of Classification Search ..................... None
See application file for complete search history.

(56) References Cited

U.S. PATENT DOCUMENTS

| | | | | |
|---|---|---|---|---|
| 7,969,924 B2* | 6/2011 | Young et al. | .................. | 370/311 |
| 8,023,467 B2* | 9/2011 | Wu et al. | ...................... | 370/331 |
| 2009/0238098 A1* | 9/2009 | Cai et al. | ...................... | 370/254 |

* cited by examiner

*Primary Examiner* — Kibrom T Hailu
(74) *Attorney, Agent, or Firm* — Potomac Patent Group PLLC

(57) ABSTRACT

Methods and apparatus for operating a user equipment (UE) for a wireless communication system. A method includes determining, by the UE, whether the UE is in a battery-efficient state; if the UE is not in a battery-efficient state, configuring the UE to transmitting a signaling connection release indicator with a cause value; if the UE is in the battery-efficient state, determining whether the UE is in a high-mobility state; if the UE is in the high-mobility state and is in the battery-efficient state, enabling the UE to transmit the signaling connection release indicator with a cause value; and if the UE is not in the high-mobility state and is in the battery-efficient state, disabling the UE from transmitting the signaling connection release indicator with a cause value.

18 Claims, 5 Drawing Sheets

FAST DORMANCY REQUESTS IN COMMUNICATION SYSTEMS

This application claims the benefit of the filing date of U.S. Provisional Patent Application No. 61/305,313 filed on Feb. 17, 2010, which is incorporated here by reference.

TECHNICAL FIELD

This invention relates to electronic digital communication systems and more particularly to cellular radio communication systems.

BACKGROUND

According to the Third Generation Partnership Project (3GPP) specifications for wireless communication systems (Release 8 and later Releases), a Long Term Evolution (LTE) cellular radio communication system uses Orthogonal Frequency Division Multiple Access (OFDM) as a multiple access technique (called OFDMA) in the downlink (DL) from network nodes (evolved NodeBs, or eNodeBs) to user equipments (UEs) and Discrete Fourier Transform (DFT)-spread OFDM in the uplink (UL) from UEs to eNBs. The LTE specifications can be seen as an evolution of current wideband code division multiple access (WCDMA) system specifications. An LTE system is sometimes also called an Evolved Universal Terrestrial Radio Access (E-UTRA) communication system.

WCDMA communication system channels are described in 3GPP Technical Specification (TS) 25.211 V8.6.0, Physical Channels and Mapping of Transport Channels onto Physical Channels (FDD) (Release 8) (December 2009) and other specifications. For example, a high speed downlink shared channel (HS-DSCH) carries paging messages, among other information.

LTE communication channels are described in 3GPP TS 36.211 V9.1.0, Physical Channels and Modulation (Release 9) (December 2009) and other specifications. For example, control information exchanged by eNodeBs and UEs is conveyed by physical uplink control channels (PUCCHs) and by physical downlink control channel (PDCCHs). In an OFDMA communication system, a data stream to be transmitted is portioned among a number of narrowband subcarriers that are transmitted in parallel. In general, a physical resource block is a particular number of particular subcarriers used for a particular period of time. Different groups of subcarriers can be used at different times for different purposes and different users. OFDMA communication systems are described in the literature, for example, U.S. Patent Application Publication No. US 2008/0031368 A1 by B. Lindoff et al.

3GPP TS 25.331 V8.9.0, Radio Resource Control (RRC), Protocol Specification (Release 8) (December 2009) specifies an RRC protocol for the radio interface between a UE and a radio access network (RAN) that includes NodeBs and Radio Network Controllers in WCDMA communication systems, and 3GPP TS 36.331 V8.8.0, Radio Resource Control (RRC), Protocol Specification (Release 8) (December 2009) specifies the RRC protocol for the radio interface between a UE and a RAN that includes eNodeBs in LTE and other communication systems. The current RRC protocol specifies RRC procedures, including RRC state transitions and a Fast Dormancy procedure that enables UEs that are "connected all the time" to save battery power. An RRC connection is a point-to-point bi-directional connection between RRC peer entities in the UE and RAN that is characterized by the allocation of a radio network temporary identifier.

A UE has either zero or one RRC connection that can include several signaling connections. A UE is in a "Connected mode" state when the UE is switched on and with an RRC connection established, and the UE is in an "Idle mode" state when the UE is switched on and without an RRC connection established. In a WCDMA communication system, the "Connected mode" states currently specified by 3GPP TS 25.331 are denoted CELL_PCH, URA_PCH, CELL_FACH and CELL_DCH. In an LTE system, the only "Connected mode" state currently specified by 3GPP TS 36.331 is denoted RRC_CONNECTED.

FIG. 1 illustrates a user plane of an exemplary LTE cellular communication system 100 that includes UEs 110, 120, a RAN that includes a plurality of eNodeBs 130-1, 130-2, . . . , 130-N, and a core network (CN) that includes a serving gateway (SGW) node 140 and a packet data network 150. Other nodes can also be provided in the system 100.

Each eNodeB 130-1, 130-2, . . . , 130-N serves a respective geographical area that is divided into one or more cells. An eNodeB can use one or more antennas at one or more sites to transmit information into its cell(s), and different antennas can transmit respective, different pilot and other signals. Neighboring eNodeBs are coupled to each other by an X2-protocol interface that supports active-mode mobility of the UEs. An eNodeB controls various radio network functions, including for example single-cell radio resource management (RRM), such as radio access bearer setup, handover, UE UL/DL scheduling, etc. Multi-cell RRM functions can also use the X2-protocol interfaces. Each eNodeB also carries out the Layer-1 functions of coding, decoding, modulating, demodulating, interleaving, de-interleaving, etc.; and the Layer-2 retransmission mechanisms, such as hybrid automatic repeat request (HARQ), and functions of radio link control (RLC) and RRC. The eNodeBs 130-1, 130-2, . . . , 130-N are coupled to one or more SGWs 140 (only one of which is shown in FIG. 1).

From the point of view of a control plane of the example LTE communication system 100, LTE-Uu protocol interfaces couple the UEs 110, 120 to the eNodeBs 130, and S1-MME protocol interfaces couple the eNodeBs 130 to a Mobility Management Entity (MME), which is a name for an SGW 140 in the control plane. In general, the LTE-Uu interface provides control-plane signaling between a UE and the RAN according to 3GPP TS 36.331.

UEs 110, 120 are generally wireless communication devices, such as cellular radiotelephones, personal digital assistants (PDAs), Personal Communications System (PCS) terminals, laptop computers, palmtop computers, or any other type of device or appliance that includes a communication transceiver that permits the device to communicate with other devices via a wireless link. A PCS terminal can combine a cellular radiotelephone with data processing, and facsimile and data communication capabilities. A PDA can include a radiotelephone, a pager, an Internet/intranet access device, a web browser, an organizer, calendars, and/or a global positioning system (GPS) receiver. One or more of UEs 110, 120 can be referred to as a "pervasive computing" device. In some implementations, the UEs 110, 120 can include wireline telephones (e.g., Plain Old Telephone system (POTs) telephones) that are connected to a Public Switched Telephone Network (PSTN). In any event, the UEs 110, 120 carry out the appropriate functions of Layers 1-3 etc. in cooperation with the eNodeBs.

The network 100 can exchange information with one or more other networks of any type, including a local area network (LAN); a wide area network (WAN); a metropolitan area network; a telephone network, such as a public switched terminal network or a public land mobile network; a satellite network; an intranet; the Internet; or a combination of networks. It will be appreciated that the number of nodes illustrated in FIG. 1 is purely exemplary. Other configurations with more, fewer, or a different arrangement of nodes can be implemented. Moreover, one or more nodes in FIG. 1 can perform one or more of the tasks described as being performed by one or more other nodes in FIG. 1. For example, parts of the functionality of the eNodeBs can be divided among one or more base stations and one or more radio network controllers, and other functionalities can be moved to other nodes in the network.

According to subclause 8.1.13 of 3GPP 25.331, for example, a signaling connection release procedure is used to notify the UE that one of its RRC signaling connections has been released. The procedure is initiated by RAN transmission of a release message on a DL dedicated control channel (DCCH), and in response to the message, the UE indicates the release by transmission of an UL indicator message as specified in subclause 8.1.14 of 3GPP 25.331.

FIG. 2 illustrates the signaling connection release indication procedure specified by subclause 8.1.14 of 3GPP TS 25.331 that is used by the UE to indicate to the RAN that one of its signaling connections has been released or to request the RAN to initiate a state transition to a battery-efficient RRC state. Such an indicator, or request, is sometimes called a "fast dormancy" request, and in response to such an UL indicator message, the RAN can send a DL message that reconfigures the UE to a more power-efficient state. If the UE does not send such a "fast dormancy" request, the UE typically remains in a less power-efficient state for a longer time, depending for example on network implementation (e.g., whether the network includes a UE inactivity timer).

As specified by subclause 8.1.14.2 of 3GPP 25.331, for example, the network can restrict the frequency of a UE's transmitting signaling connection release indications, and thus "fast dormancy" requests, by broadcasting a prohibit timer (which is called T323 in 3GPP TS 25.331). The timer is started when the UE transmits a signaling connection release indicator with a cause value, and while the timer is running, the UE is inhibited from sending further signaling connection release indicators with a cause value corresponding to UE-requested packet-switched data session end. The frequency of signaling connection release indicators can also be limited by a counter, e.g., a total number of permitted requests in a state, such as the CELL/URA_PCH state. The frequency of signaling connection release indicators can also be limited by prohibiting transmission of signaling connection release indicators with a cause value if the discontinuous reception (DRX) cycle of the URA_PCH state or CELL_PCH state is long enough that the URA_PCH state or CELL_PCH state can be considered to be battery-efficient.

Even if the DRX cycle in the URA_PCH state or CELL_PCH state is long enough for the state to be considered battery-efficient, however, a mobile UE can be required to send more CELL or URA updates in the CELL_PCH or URA_PCH states than it is in RRC Idle mode. Current ways to limit the signaling load do not consider this aspect, as the Fast Dormancy procedure specified in 3GPP TS 25.331, for example, does not distinguish the DRX settings and mobility while the UE is in the URA_PCH state or CELL_PCH state. Thus, under some conditions the UE can uselessly request Fast Dormancy (and waste power doing so) while the network decides to keep the UE in the CELL_PCH state or URA_PCH state because it is considered battery-efficient.

SUMMARY

In accordance with this invention, the amount of signaling in the URA_PCH and CELL_PCH states and other states of a UE is limited by inhibiting the UE from sending signaling connection release indications with cause values (i.e., Fast Dormancy requests) in a battery-efficient state, but allowing the UE to send Fast Dormancy requests when the UE has detected that it is mobile.

In accordance with aspects of this invention, there is provided a method of operating a user equipment (UE) for a wireless communication system. The method includes recognizing that further data for a UE signaling connection is not available; determining, by the UE, whether the UE is in a battery-efficient state; if the UE is not in the battery-efficient state, enabling the UE to transmit a signaling connection release indicator with a cause value; if the UE is in the battery-efficient state, determining whether the UE is in a high-mobility state; if the UE is in the high-mobility state and is in the battery-efficient state, enabling the UE to transmit the signaling connection release indicator with the cause value; and if the UE is not in the high-mobility state and is in the battery-efficient state, disabling the UE from transmitting the signaling connection release indicator with the cause value.

Also in accordance with aspects of this invention, there is provided an apparatus in a UE for a wireless communication system. The apparatus includes an electronic processor circuit configured for recognizing that further data for a UE signaling connection is not available; for determining whether the UE is in a battery-efficient state; for determining, if the UE is in the battery-efficient state, whether the UE is in a high-mobility state; for enabling, if the UE is not in the battery-efficient state or if the UE is in the high-mobility state and is in the battery-efficient state, the UE to transmit a signaling connection release indicator with a cause value; and for disabling, if the UE is not in the high-mobility state and is in the battery-efficient state, the UE from transmitting the signaling connection release indicator with a cause value.

Also in accordance with aspects of this invention, there is provided a computer-readable medium have non-transient stored instructions that, when executed by a computer in a UE for a wireless communication system, cause the computer to carry out a method of operating the UE. The method includes recognizing that further data for a UE signaling connection is not available; determining, by the UE, whether the UE is in a battery-efficient state; if the UE is not in the battery-efficient state, enabling the UE to transmit a signaling connection release indicator with a cause value; if the UE is in the battery-efficient state, determining whether the UE is in a high-mobility state; if the UE is in the high-mobility state and is in the battery-efficient state, enabling the UE to transmit the signaling connection release indicator with the cause value; and if the UE is not in the high-mobility state and is in the battery-efficient state, disabling the UE from transmitting the signaling connection release indicator with the cause value.

BRIEF DESCRIPTION OF THE DRAWINGS

The various features, objects, and advantages of this invention will be understood by reading this description in conjunction with the drawings, in which.

DETAILED DESCRIPTION

Figure 1:
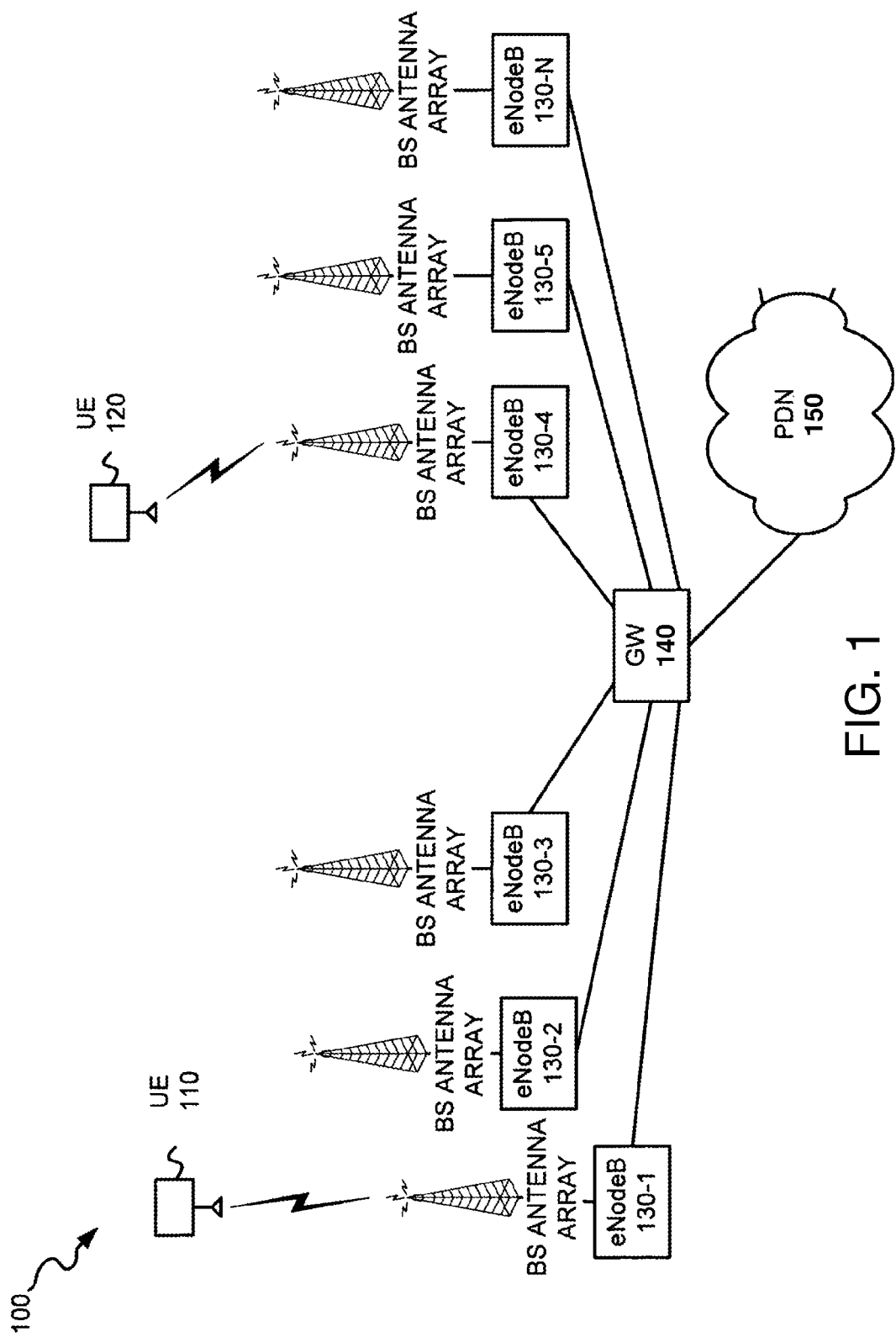
FIG. 1 illustrates a user plane of an exemplary communication system.
Figure 2:
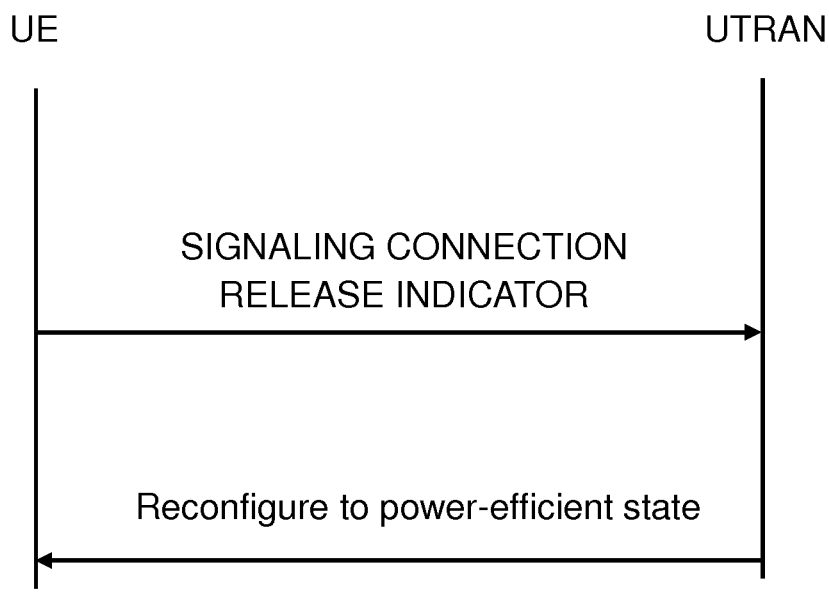
FIG. 2 illustrates a signaling connection release indication procedure.

The inventors have recognized that the amount of signaling by a UE can be advantageously limited by inhibiting the UE from transmitting a signaling connection release indicator with a cause value (i.e., a Fast Dormancy request) when the UE is in a battery-efficient state, but permitting the UE to transmit a signaling connection release indicator with a cause value (i.e., a Fast Dormancy request) when the UE has determined that it is mobile, i.e., that it is moving with a speed that exceeds a threshold value. Whether the UE is in a battery-efficient state can be determined based on the DRX cycle of the UE.

For example, when the UE is in a PCH state (e.g., CELL_PCH and URA_PCH), the most important parameter that determines the UE's power consumption is DRX cycle length, i.e., the duration that the UE can "sleep" (e.g., turn off its radio). Another important parameter that determines UE power consumption is the mobility (speed) of the UE. When the UE moves, the network keeps track of the UE with a granularity in the URA_PCH state that is different from the granularity in the CELL_PCH state. In CELL_PCH, as the name suggests, the network keeps track of the UE on a cell level, i.e., the cell in which the UE is located. If the UE re-selects to another cell, the UE transmits a CELL UPDATE message to inform the network of the change of cell. In the URA_PCH state, the network keeps track of the UE on a UTRAN Registration Area (URA) level, i.e., the URA in which the UE is located. A cell is typically smaller than a URA. The artisan will note that when the UE is in Idle mode, the network keeps track of the UE on a Location Area level (for the circuit-switched (CS) domain) and on a Routing Area level (for the packet-switched (PS) domain), and a URA is typically smaller than a Location Area or Routing Area.

Thus, in accordance with this invention, when a UE is in a URA_PCH state or CELL_PCH state, the UE is inhibited from sending Fast Dormancy requests when the DRX cycle in the URA_PCH state is equal to or larger than the minimum of the DRX cycles in Idle mode for the CS and PS domains and the UE is in a low mobility state. If either the DRX cycle in the URA_PCH state is less than the minimum of the DRX cycles in Idle mode for the CS and PS domains or the UE is in a high mobility state, the UE is enabled to send Fast Dormancy requests. It will be understood that a UE can be configured to operate differently in the URA_PCH and CELL_PCH states. Moreover, a UE, when enabled, can send one, several, or an unlimited number of Fast Dormancy requests, and the number sent can be either hard-coded (programmed) in the UE or signaled to the UE by the network. In addition, sending a Fast Dormancy request can initiate the RRC connection release procedure.

Similarly, when the UE is in the Connected mode state CELL_FACH, the UE's power consumption is greater than it is when the UE is in Idle mode. Thus, also in accordance with this invention, whether a UE in the CELL_FACH state is in a battery-efficient state can be determined based on the DRX cycle of the UE. For example, a UE can be considered to be in a battery-efficient state if it is in the CELL_FACH state with its DRX cycle set to, say, 320 milliseconds (ms), which is to say that its DRX cycle length is 320 ms, and its "wake up" time is set to a low value, say, 10 ms. The "wake-up" time in this case is the duration of the successive downlink HS-DSCH bursts that the UE must have its receiver switched on and configured to receive.

The UE's DRX cycle length is typically selectable by the network, and in a WCDMA communication system has a value that is an integer multiple of 80 ms, up to 5120 ms. The UE's wake up time is also typically selectable by the network, and in a WCDMA communication has a value that is an integer multiple of 10 ms. Currently available UEs can be considered to be in a battery-efficient state when the ratio of their DRX cycle length to their "wake time" is at least about 16:1 (e.g., 320 ms/20 ms), although as UEs become progressively more efficient in their overall use of battery energy, the 16:1 ratio progressively decreases. Such a UE is advantageously inhibited from sending Fast Dormancy requests when its DRX cycle in the CELL_FACH state is much larger than its "wake up" time and the UE is in a low mobility state.

The "wake up" time in WCDMA communication systems corresponds to an "on duration" time in LTE communication systems. DRX in the RRC_Connected state involves short on-duration phases, in which data transfer can start, followed by possible inactive (DRX) phases. If data transfer does not start in an on-duration phase, the UE can switch off its receiver and save energy until the next on-duration phase. The DRX cycle length thus can be measured from the start of an on-duration phase to the start of the next on-duration phase. If the UE detects data during an on-duration phase, the UE starts an inactivity timer, aiming to extend its active time. The on-duration and inactivity timers are selectable by the network, and the on-duration time ranges from 1 ms to 200 ms. An RRC layer in an eNodeB configures the DRX operation in either of two DRX schemes. The basic scheme is such that the cyclic DRX pattern occurs with one inactivity timer, and the optional alternative scheme is such that the DRX pattern is initially a Short DRX, with a cycle length ranging from 2 ms to 640 ms, or a Long DRX, with a cycle length ranging from 10 ms to 2560 ms. Such a UE is advantageously inhibited from sending Fast Dormancy requests when its DRX cycle in the RRC_CONNECTED state is much larger than its "on duration" time and the UE is in a low mobility state.

In an example embodiment, the UE determines whether it is in a low or high mobility state by determining a number per unit time of its cell re-selections and comparing that number with a threshold value. For example, if the UE has performed more than two cell re-selections in the last minute, it is enabled to send a Fast Dormancy request (i.e., the UE is in a high mobility state) even if the UE is in a battery-efficient state (e.g., the DRX cycle in the URA_PCH state is equal to or larger than the minimum of the DRX cycles in Idle mode for the CS and PS domains).

In another embodiment, the UE determines whether it is in a low or high mobility state based on a number of its cell re-selections. For example, the UE is permitted to send a Fast Dormancy request after every cell re-selection.

In other embodiments, the UE determines whether it is in a low or high mobility state in other ways. For example, a UE in Connected mode can determine its number of hand-overs, number of hand-overs per unit time, measured Doppler frequency shift, or speed of the UE, and compare the determined value to a threshold value. The UE's speed can be determined using a built-in GPS device or speedometer.

Figure 3:
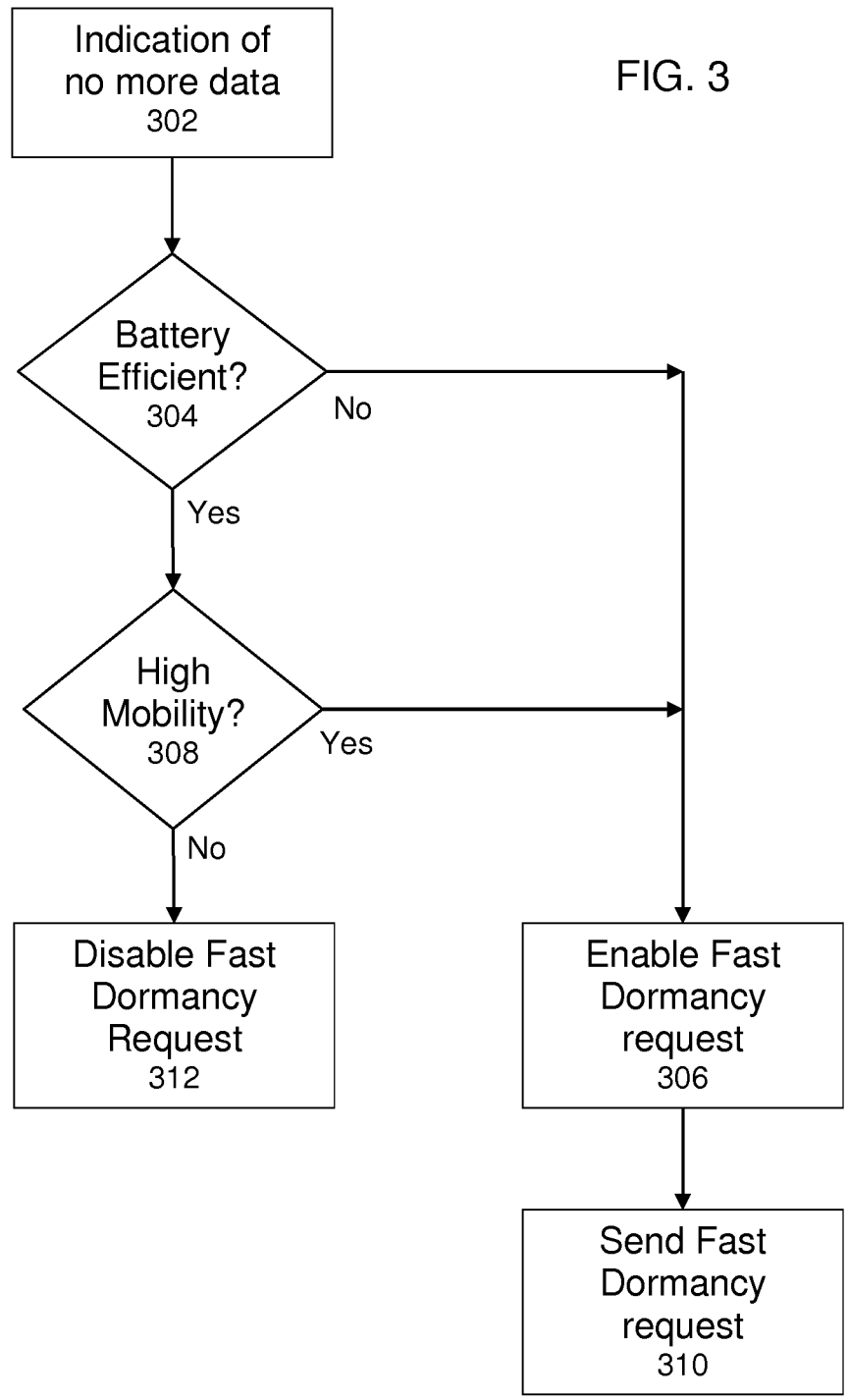
FIG. 3 is a flow chart that depicts a method of operating a user equipment in a communication system.

FIG. 3 is a flow chart that depicts a method of operating a UE in a communication system as described above. In step 302, the UE receives a suitable message or generates itself a suitable indication that further data for an existing CS or PS signaling connection is not available. Such a message or indication triggers evaluation in the UE of a Fast Dormancy procedure, and can derive from an application layer or higher layer processing.

In step 304, the UE determines whether it is in a battery-efficient state, and that determination is preferably based on the DRX cycle of the UE. For example, the UE can determine whether its DRX cycle in the CELL_PCH state or URA_PCH state is less than its DRX cycle in Idle mode for the CS domain and/or its DRX cycle in Idle mode for the PS domain. For another example, the UE's determination of whether it is in the battery-efficient state can be based on whether the ratio of its DRX cycle in the CELL_FACH state to its "wake time" or the ratio of its DRX cycle in the RRC_CONNECTED state to its "on duration" time is at least a threshold value, e.g., 16:1.

If the UE determines that it is not in a battery-efficient state (No in step 304), the UE enables itself to transmit a Fast Dormancy request (i.e., a signaling connection release indicator with a cause value) (step 306), subject to other possible limitations.

If the UE determines that it is in a battery-efficient state (Yes in step 304), the UE determines whether it is in a high mobility state (step 308). A number of ways are described above that can be used to make that determination. If the UE determines that it is in a high mobility state, or equivalently that it is not in a low mobility state, (Yes in step 308), the UE also enables itself to transmit a Fast Dormancy request (i.e., a signaling connection release indicator with a cause value) (step 306), subject to other possible limitations. In due course, the UE transmits (step 310) a Fast Dormancy request.

If the UE determines that it is not in a high mobility state (No in step 308), or equivalently that it is in a low mobility state, the UE disables itself from transmitting a Fast Dormancy request (i.e., a signaling connection release indicator with a cause value) (step 312), e.g., the UE is inhibited from transmitting a Fast Dormancy request.

Thus, when a UE is in the CELL_DCH, CELL_FACH, CELL_PCH, or URA_PCH state (for WCDMA) or the RRC_Connected state (for LTE) and is configured to operate as described above, the UE's power consumption should be similar to its power consumption in Idle mode, and so there should be little reason for the UE to send a Fast Dormancy request. This reduces the signaling load in the network at the same time that it does not increase the power consumption in the UE.

An even more detailed description of the above-described methods of operating a UE in a WCDMA communication system follows, and it will be understood that such methods of operating a UE can be suitably employed in LTE and other communication systems.

The UE can, on receiving a request from upper layers to release (abort) a signaling connection for the CS or PS domain:
1> if a signaling connection in the variable ESTABLISHED_SIGNALING_CONNECTIONS for the specific domain identified with the information element (IE) "CN domain identity" exists:
  2> initiate the signaling connection release indication procedure.
1> otherwise:
  2> abort any on-going establishment of signaling connection for that specific CN domain as specified in 3GPP TS 25.331 subclause 8.1.3.5a.

Upon initiation of the signaling connection release indication procedure in the CELL_PCH or URA_PCH state, the UE:
1> if variable READY_FOR_COMMON_EDCH is set to TRUE:
  2> moves to CELL_FACH state;
  2> restarts the timer T305 using its initial value if periodical cell update has been configured by T305 in the IE "UE Timers and constants in connected mode" set to any other value than "infinity".
1> else:
  2> if variable H_RNTI and variable C_RNTI are set:
    3> continues with the signaling connection release indication procedure as below.
  2> else:
    3> performs a cell update procedure, according to 3GPP TS 25.331 subclause 8.3.1, using the cause "uplink data transmission";
    3> when the cell update procedure is completed successfully:
      4> continues with the signaling connection release indication procedure as below.

The UE:
1> sets the IE "CN Domain Identity" to the value indicated by the upper layers. The value of the IE indicates the CN domain whose associated signaling connection the upper layers are indicating to be released;
1> transmits a SIGNALING CONNECTION RELEASE INDICATION message on DCCH.
1> if the SIGNALING CONNECTION RELEASE INDICATION message did not include the IE "Signalling Connection Release Indication Cause" set to "UE Requested PS Data session end":
  2> removes the signaling connection with the identity indicated by upper layers from the variable ESTABLISHED_SIGNALING_CONNECTIONS.

When the successful delivery of the SIGNALING CONNECTION RELEASE INDICATION message has been confirmed by RLC, the procedure ends.

In addition, if the timer T323 value is stored in the IE "UE Timers and constants in connected mode" in the variable TIMERS_AND_CONSTANTS, and if there is no CS domain connection indicated in the variable ESTABLISHED_SIGNALING_CONNECTIONS, the UE can:
1> if the upper layers indicate that there is no more PS data for a prolonged period:
  2> if timer T323 is not running:
    3> if the UE is in the CELL_DCH or CELL_FACH state; or
    3> if the UE is in the CELL_PCH or URA_PCH state and the DRX cycle is shorter than the shorter CN-domain-specific DRX cycle for the PS domain and CS domain; or
    3> if the UE is in the CELL_PCH or URA_PCH state and the DRX cycle is equal to or longer than the shorter CN-domain-specific DRX cycle for the PS domain and CS domain and V316<1; and
    3> if the UE is not in a low-mobility state:
      4> increment V316 by 1 if the UE is in the CELL_PCH or URA_PCH state and the DRX cycle is equal to or longer than the shorter CN-domain-specific DRX cycle for the PS domain and CS domain;
      4> set the IE "CN Domain Identity" to PS domain;
      4> set the IE "Signaling Connection Release Indication Cause" to "UE Requested PS Data session end";
      4> transmit a SIGNALING CONNECTION RELEASE INDICATION message on DCCH;
      4> start the timer T323.

The counter V316 is reset at transmission or reception of PS data or entering RRC Connected mode, among other conditions, and when V316 has a value greater than or equal to unity, the UE stops sending any further SIGNALING CON- NECTION RELEASE INDICATION messages, with the IE "Signaling Connection Release Indication Cause" set to "UE Requested PS Data session end" in the CELL_PCH state or URA_PCH state for as long as the DRX cycle length in use is equal to or longer than the shorter CN-domain-specific DRX cycle length for the PS domain and CS domain.

When the successful delivery of the SIGNALING CONNECTION RELEASE INDICATION message has been confirmed by RLC the procedure ends. The UE is inhibited from sending the SIGNALING CONNECTION RELEASE INDICATION message with the IE "Signaling Connection Release Indication Cause" set to "UE Requested PS Data session end" while the timer T323 is running.

The UE does not need to locally release a PS signaling connection after it has sent the SIGNALING CONNECTION RELEASE INDICATION message with the IE "Signaling Connection Release Indication Cause" set to "UE Requested PS Data session end".

If a re-establishment of the transmitting side of the RLC entity on signaling radio bearer RB2 occurs before the successful delivery of the SIGNALING CONNECTION RELEASE INDICATION message has been confirmed by RLC, the UE:

1> retransmits the SIGNALING CONNECTION RELEASE INDICATION message on the uplink DCCH on signaling radio bearer RB2.

If a handover between radio access technologies from UTRAN (an Inter-RAT handover from UTRAN) procedure occurs before the successful delivery of the SIGNALING CONNECTION RELEASE INDICATION message has been confirmed by RLC, the UE:

1> aborts the signaling connection while in the new RAT.

Upon reception of a SIGNALING CONNECTION RELEASE INDICATION message, if the IE "Signaling Connection Release Indication Cause" is not included the UTRAN requests the release of the signaling connection from upper layers. Upper layers can then initiate the release of the signaling connection. If the IE "Signaling Connection Release Indication Cause" is included in the SIGNALING CONNECTION RELEASE INDICATION message, the UTRAN can initiate a state transition to efficient battery consumption IDLE, CELL_PCH, URA_PCH or CELL_FACH state.

When timer T323 expires:

1> the UE can determine whether any subsequent indications from upper layers that there is no more PS data for a prolonged period in which case it triggers the transmission of a single SIGNALING CONNECTION RELEASE INDICATION message according to 3GPP TS 25.331 subclause 8.1.14.2;

1> the procedure ends.

Figure 4A:
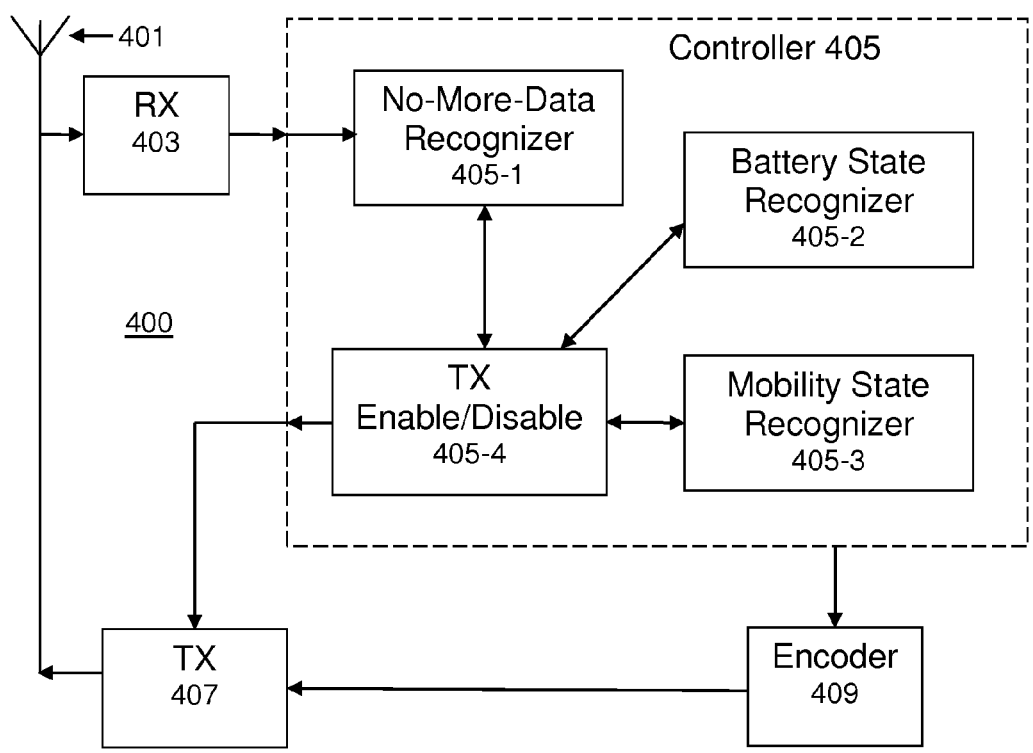
FIG. 4 is a block diagram of an arrangement in a user equipment.
Figure 4B:
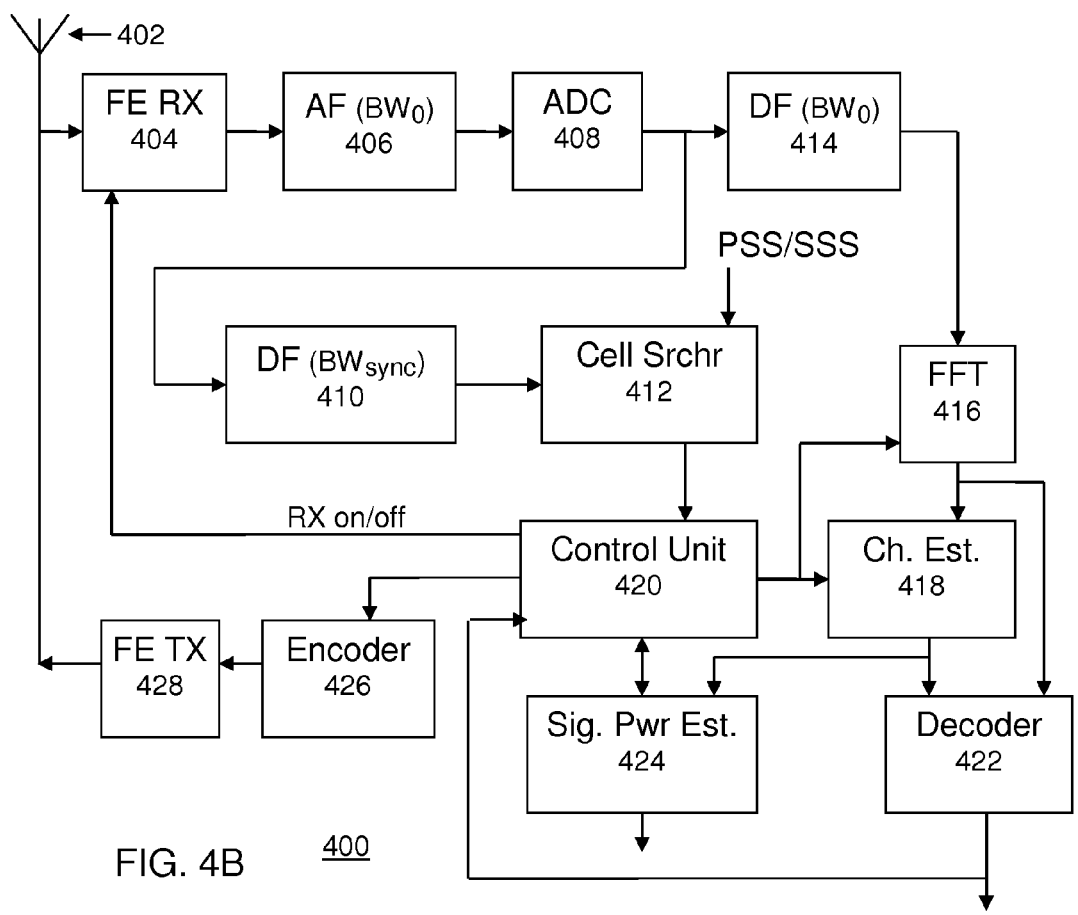

FIGS. 4A, 4B are block diagrams of arrangements in a UE that can implement the methods described above. It will be appreciated that the functional blocks depicted in FIGS. 4A, 4B can be combined and re-arranged in a variety of equivalent ways, and that many of the functions can be performed by one or more suitably programmed digital signal processor circuits. Moreover, connections among and information provided or exchanged by the functional blocks depicted in FIGS. 4A, 4B can be altered in various ways to enable a UE to implement other methods involved in the operation of the UE.

In the arrangement 400 as depicted in FIG. 4A, a UE receives a DL radio signal through an antenna 401 and extracts information from the received radio signal with a suitable receiver (RX) 403. Such information can include information suitable for a controller 405 to recognize that further data for a UE signaling connection is not available. In that respect, the controller 405 is configured to implement a no-more-data recognizer 405-1. The controller 405 is further configured to implement a battery-state recognizer 405-2 that determines whether the UE is in a battery-efficient state, and a mobility-state recognizer 405-3 that determined whether the UE is in a high-mobility state.

The controller 405 is also configured to implement a transmit enable/disable control 405-4 that sends a suitable control signal to a transmitter (TX) 407, either enabling or disabling the transmitter 407 to transmit a signaling connection release indicator with a cause value. That indicator is packaged in a suitable message by an encoder 409 for transmission by the TX 407 via the antenna 401.

As described above, the recognizer 405-2 can be configured to determine whether the UE is in the battery-efficient state based on a discontinuous reception (DRX) cycle of the UE, including whether the DRX cycle in a URA_PCH state is less than a DRX cycle in Idle mode for both a circuit-switched domain and a packet-switched domain. Also as described above, the recognizer 405-3 can be configured to determine whether the UE is in the high-mobility state by determining a number of UE cell re-selections during a predetermined time period and comparing the number with a threshold value, or determining a number of UE hand-overs during a predetermined time period and comparing the number with a threshold value, or determining a speed of the UE and comparing the speed with a threshold value.

In the arrangement 400' as depicted in FIG. 4B, a UE receives a DL radio signal through an antenna 402 and typically down-converts the received radio signal to an analog baseband signal in a front end receiver (FE RX) 404. The baseband signal is spectrally shaped by an analog filter 406 that has a bandwidth $BW_0$, and the shaped baseband signal generated by the filter 406 is converted from analog to digital form by an analog-to-digital converter (ADC) 408.

The digitized baseband signal is further spectrally shaped by a digital filter 410 that has a bandwidth $BW_{sync}$, which corresponds to the bandwidth of synchronization signals or symbols included in the DL signal. The shaped signal generated by the filter 410 is provided to a cell search unit 412 that carries out one or more methods of searching for cells as specified for the particular communication system, e.g., LTE. Typically, such methods involve detecting predetermined primary and/or secondary synchronization signals (PSS/SSS) in the received signal.

The digitized baseband signal is also provided by the ADC 408 to a digital filter 414 that has the bandwidth $BW_0$, and the filtered digital baseband signal is provided to a processor 416 that implements a fast Fourier transform (FFT) or other suitable algorithm that generates a frequency-domain (spectral) representation of the baseband signal. A channel estimation unit 418 receives signals from the processor 416 and generates a channel estimate $H_{i,j}$ for each of several subcarriers i and eNodeBs j based on control and timing signals provided by a control unit 420, which also provides such control and timing information to the processor 416.

The estimator 418 provides the channel estimates $H_{i,j}$ to a decoder 422 and a signal power estimation unit 424. The decoder 422, which also receives signals from the processor 416, is suitably configured to extract information from uplink grant, RRC, and other DL messages as described above and typically generates signals subject to further processing in the UE (not shown). The estimator 424 generates received signal power measurements (e.g., estimates of reference signal received power (RSRP), received subcarrier power, signal to interference ratio (SIR), etc.). The estimator 424 can generate estimates of RSRP, reference signal received quality (RSRQ), received signal strength indicator (RSSI), received subcarrier power, SIR, and other relevant measurements, in various ways in response to control signals provided by the control unit 420. Power estimates generated by the estimator 424 are typically used in further signal processing in the UE. The estimator 424 is configured to include a suitable signal correlator. It should be understood that a signal correlator can be provided in other devices, such as the searcher 412.

In the arrangement depicted in FIG. 4, the control unit 420 keeps track of substantially everything needed to configure the searcher 412, processor 416, estimation unit 418, and estimator 424. For the estimation unit 418, this includes both method and cell identity (for reference signal extraction and cell-specific scrambling of reference signals). Communication between the searcher 412 and the control unit 420 includes cell identity and, for example, cyclic prefix configuration.

The control unit 420 can determine which of several possible estimation methods is used by the estimator 418 and/or by the estimator 424 for measurements on the detected cell(s). In addition, the control unit 420, which typically can include a correlator or implement a correlator function, can receive information signaled by the network and can control the on/off times (DRX) of the Fe RX 404.

The control unit 420 provides appropriate information to an encoder 426, which generates modulation symbols or similar information that is provided to a transmitter front-end (FE TX) 428, which generates a transmission signal appropriate to the communication system. As depicted in FIG. 4B, the transmission signal is provided to the antenna 402. The control unit 420 with the encoder 426 is suitably configured to generate RRC messages, Fast Dormancy requests, and other messages sent by the UE to the network (NW) as described above.

The control unit and other blocks of the UE can be implemented by one or more suitably programmed electronic processors, collections of logic gates, etc. that processes information stored in one or more memories. As noted above, the UE includes memory or other information storage functionality suitable for carrying out the methods and receiving and generating the signals described above in cooperation with the control unit and software executed by the control unit. The stored information can include program instructions and data that enable the control unit to implement the methods described above. It will be appreciated that the control unit typically includes timers, etc. that facilitate its operations.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

Figure 5:
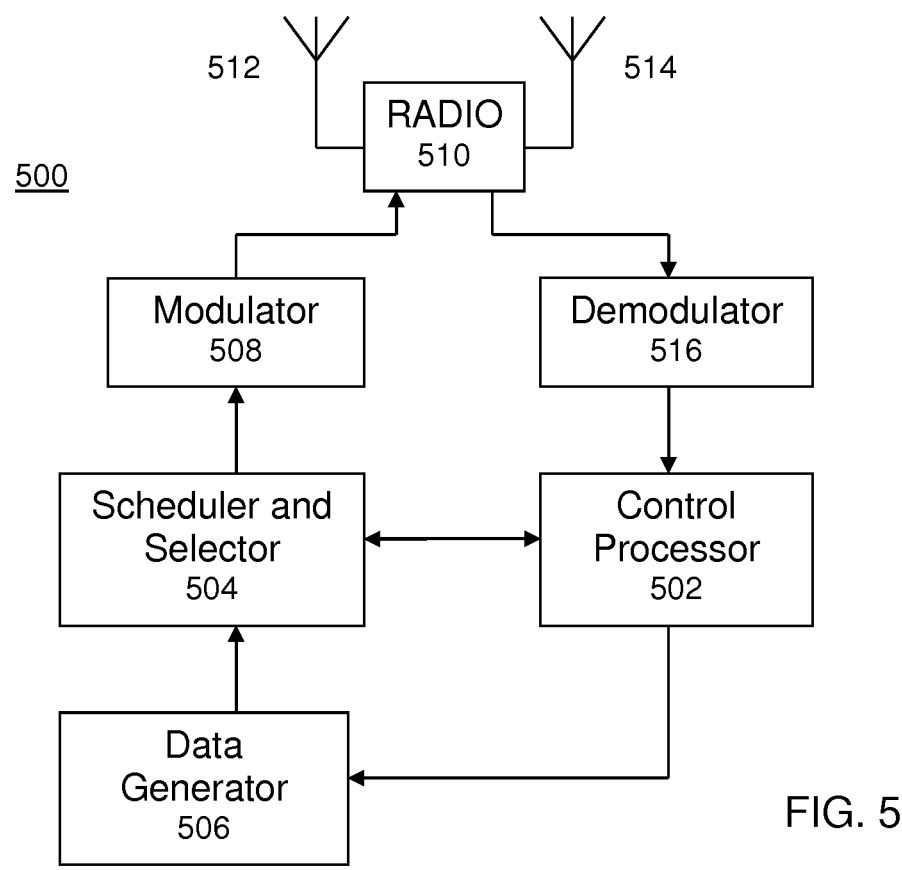
FIG. 5 is a block diagram of a portion of a transmitting node in a communication system.

FIG. 5 is a block diagram of a portion of an eNodeB 500, which is typical of base stations and other such transmitting nodes in a network that can communicate with UEs by implementing the methods described above. It will be appreciated that the functional blocks depicted in FIG. 5 can be combined and re-arranged in a variety of equivalent ways, and that many of the functions can be performed by one or more suitably programmed digital signal processors and other known electronic circuits.

The eNodeB 500 is operated by a control processor 502, which typically and advantageously is a suitably programmed digital signal processor. The control processor 502 typically provides and receives control and other signals from various devices in the eNodeB 500. For simplicity in FIG. 5, the control processor 502 is shown exchanging information with a scheduler and selector 504, which receives digital words to be transmitted to respective UEs or to be broadcast from a suitable data generator 506. The scheduler and selector 504 implements resource block and resource element scheduling and selection in an LTE system, for example, and implements code allocation in a WCDMA system, for example.

Information from the scheduler and selector 504 is provided to a modulator 508 that uses the information to generate a modulation signal suitable for the particular communication system. For example, the modulator 508 in an LTE system is an OFDM modulator. The modulation signal generated by the modulator 508 is provided to a suitable radio circuit 510 that generates a wireless signal that is transmitted through at least one transmit antenna 512. Wireless signals transmitted by UEs are captured by at least one receive antenna 514 that provides those signals to the radio 510 and a demodulator 516. The artisan will understand that the same antenna can be used for transmission and reception, as is often done in a UE.

It will be understood that the control processor 502 can be configured such that it includes one or more other devices depicted in FIG. 5, which can be implemented by dedicated programmed processors or other suitable logic configured to perform their functions. The combination of the data generator 506, scheduler and selector 504, and modulator 508 produces DL frames or sub-frames to be transmitted. The modulator 508 converts the information into modulation symbols that are provided to the radio 510, which impresses the modulation symbols on one or more suitable carrier signals. In an LTE system for example, the radio 510 impresses the modulation symbols on a number of OFDM subcarriers. The modulated subcarrier signals are transmitted through the antenna 512.

It will be appreciated that procedures described above are carried out repetitively as necessary, for example, to respond to the time-varying nature of communication channels between transmitters and receivers. It will also be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system.

Moreover, this invention can additionally be considered to be embodied entirely within any form of computer-readable storage medium having stored therein an appropriate non-transitory set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

What is claimed is:

1. A method of operating a user equipment (UE) for a wireless communication system, comprising:
    recognizing that further data for a UE signaling connection is not available;
    determining, by the UE, whether the UE is in a battery-efficient state;
    if the UE is not in the battery-efficient state, enabling the UE to transmit a signaling connection release indicator with a cause value;
    if the UE is in the battery-efficient state, determining whether the UE is in a high-mobility state;
    if the UE is in the high-mobility state and is in the battery-efficient state, enabling the UE to transmit the signaling connection release indicator with the cause value; and
    if the UE is not in the high-mobility state and is in the battery-efficient state, disabling the UE from transmitting the signaling connection release indicator with the cause value.

2. The method of claim 1, wherein determining whether the UE is in the battery-efficient state is based on a discontinuous reception (DRX) cycle of the UE.

3. The method of claim 2, wherein determining whether the UE is in the battery-efficient state includes determining whether the DRX cycle in a Connected mode state of the UE is less than a DRX cycle in an Idle mode state of the UE.

4. The method of claim 1, wherein determining whether the UE is in the high-mobility state includes determining a number of UE cell re-selections during a predetermined time period, and comparing the number with a threshold value.

5. The method of claim 1, wherein determining whether the UE is in the high-mobility state includes determining a number of UE hand-overs during a predetermined time period, and comparing the number with a threshold value.

6. The method of claim 1, wherein determining whether the UE is in the high-mobility state includes determining a speed of the UE, and comparing the speed with a threshold value.

7. An apparatus in a user equipment (UE) for a wireless communication system, comprising:
    an electronic processor circuit configured for recognizing that further data for a UE signaling connection is not available; for determining whether the UE is in a battery-efficient state; for determining, if the UE is in the battery-efficient state, whether the UE is in a high-mobility state; for enabling, if the UE is not in the battery-efficient state or if the UE is in the high-mobility state and is in the battery-efficient state, the UE to transmit a signaling connection release indicator with a cause value; and for disabling, if the UE is not in the high-mobility state and is in the battery-efficient state, the UE from transmitting the signaling connection release indicator with a cause value.

8. The apparatus of claim 7, wherein the electronic processor circuit is configured for determining whether the UE is in the battery-efficient state based on a discontinuous reception (DRX) cycle of the UE.

9. The apparatus of claim 8, wherein the electronic processor circuit is configured for determining whether the UE is in the battery-efficient state by at least determining whether the DRX cycle in a Connected mode state of the UE is less than a DRX cycle in an Idle mode state of the UE.

10. The apparatus of claim 7, wherein the electronic processor circuit is configured for determining whether the UE is in the high-mobility state by at least determining a number of UE cell re-selections during a predetermined time period, and comparing the number with a threshold value.

11. The apparatus of claim 7, wherein the electronic processor circuit is configured for determining whether the UE is in the high-mobility state by at least determining a number of UE hand-overs during a predetermined time period, and comparing the number with a threshold value.

12. The apparatus of claim 7, wherein the electronic processor circuit is configured for determining whether the UE is in the high-mobility state by at least determining a speed of the UE, and comparing the speed with a threshold value.

13. A computer-readable medium have non-transient stored instructions that, when executed by a computer in a user equipment (UE) for a wireless communication system, cause the computer to carry out a method of operating the UE, wherein the method comprises:
    recognizing that further data for a UE signaling connection is not available;
    determining, by the UE, whether the UE is in a battery-efficient state;
    if the UE is not in the battery-efficient state, enabling the UE to transmit a signaling connection release indicator with a cause value;
    if the UE is in the battery-efficient state, determining whether the UE is in a high-mobility state;
    if the UE is in the high-mobility state and is in the battery-efficient state, enabling the UE to transmit the signaling connection release indicator with the cause value; and
    if the UE is not in the high-mobility state and is in the battery-efficient state, disabling the UE from transmitting the signaling connection release indicator with the cause value.

14. The medium of claim 13, wherein determining whether the UE is in the battery-efficient state is based on a discontinuous reception (DRX) cycle of the UE.

15. The medium of claim 14, wherein determining whether the UE is in the battery-efficient state includes determining whether the DRX cycle in a Connected mode state of the UE is less than a DRX cycle in an Idle mode state of the UE.

16. The medium of claim 13, wherein determining whether the UE is in the high-mobility state includes determining a number of UE cell re-selections during a predetermined time period, and comparing the number with a threshold value.

17. The medium of claim 13, wherein determining whether the UE is in the high-mobility state includes determining a number of UE hand-overs during a predetermined time period, and comparing the number with a threshold value.

18. The medium of claim 13, wherein determining whether the UE is in the high-mobility state includes determining a speed of the UE, and comparing the speed with a threshold value.

* * * * *